Nov. 8, 1955 C. W. SNYDER 2,722,952
JOINTED RADIAL ARM MOUNTING FOR CUTTING TOOL
Filed April 6, 1951 3 Sheets-Sheet 1
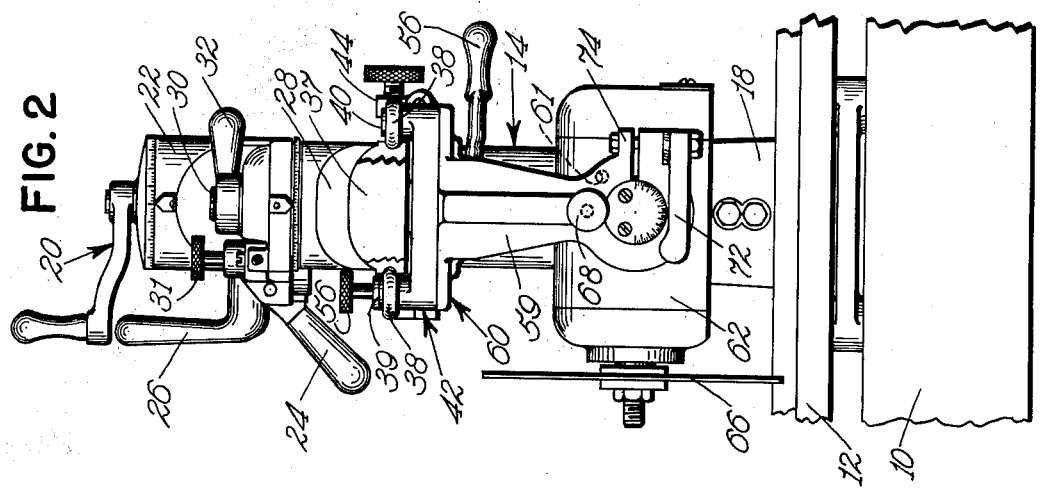
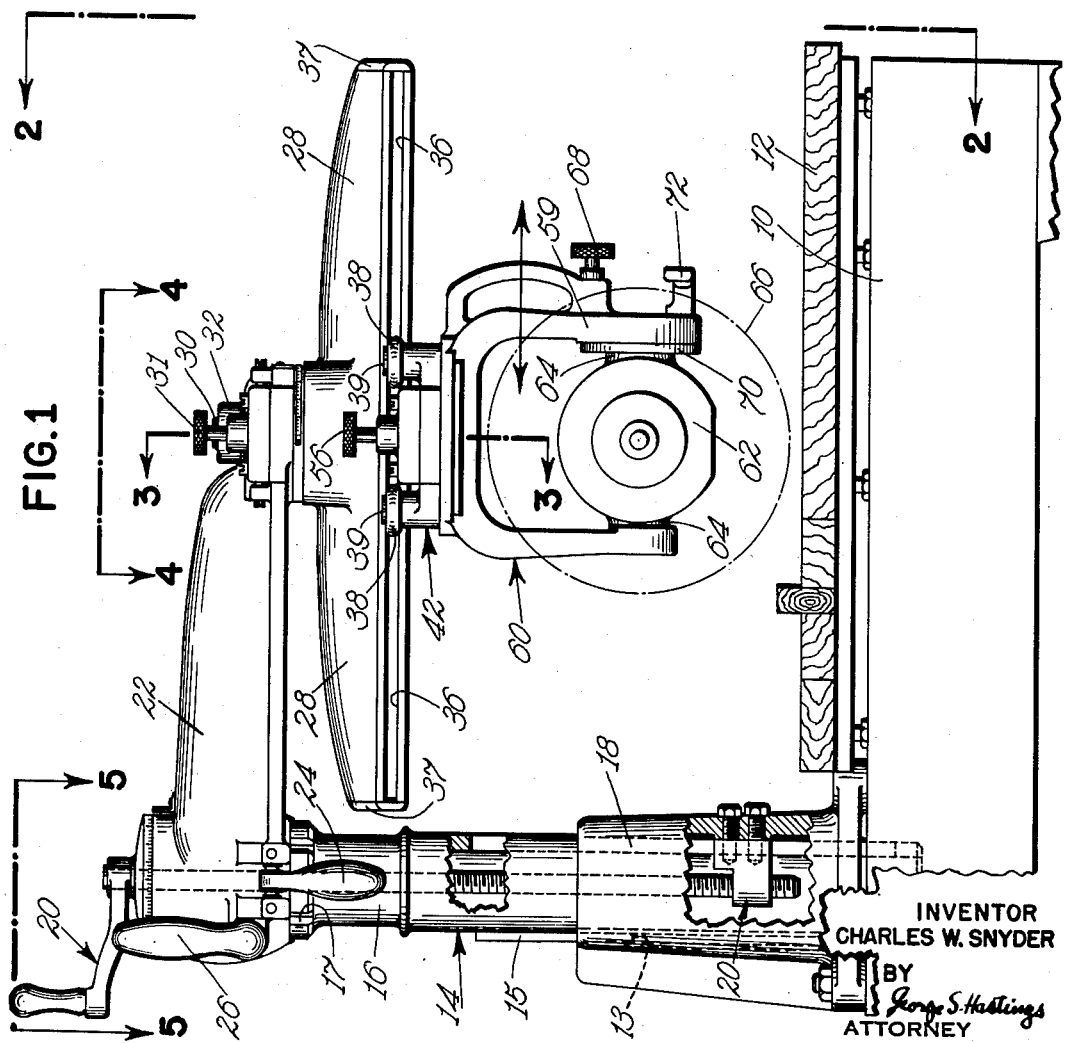
INVENTOR
CHARLES W. SNYDER
BY
George S. Hastings
ATTORNEY

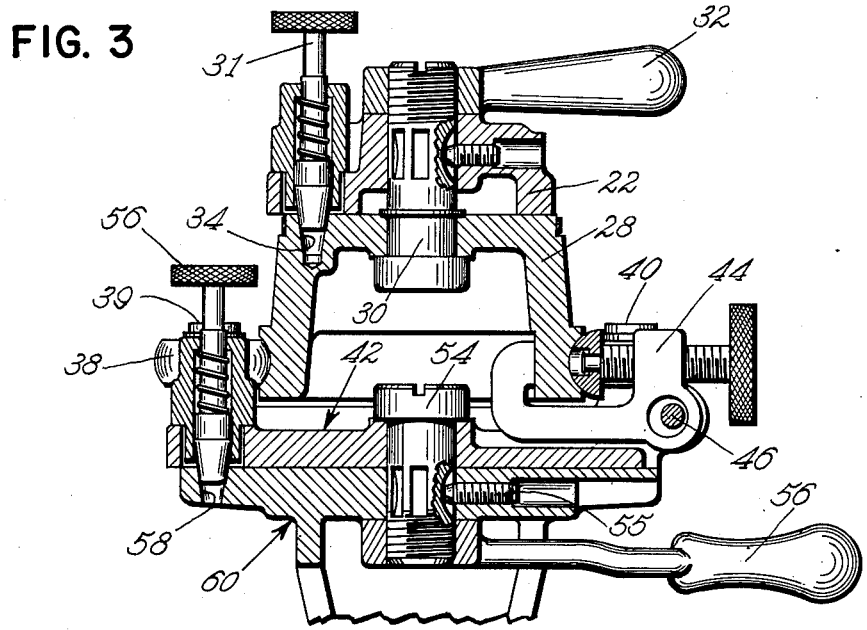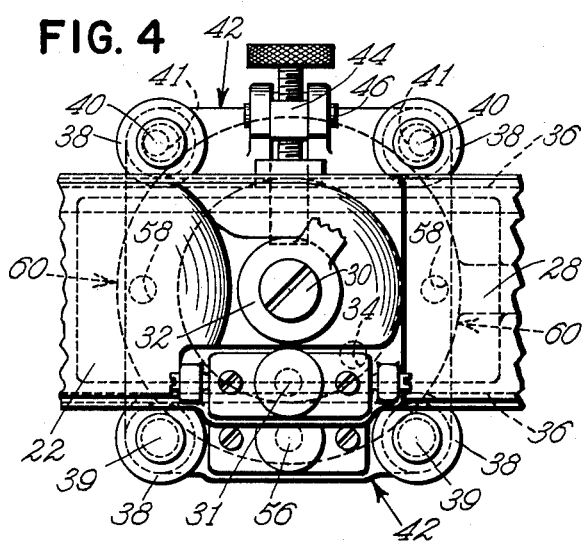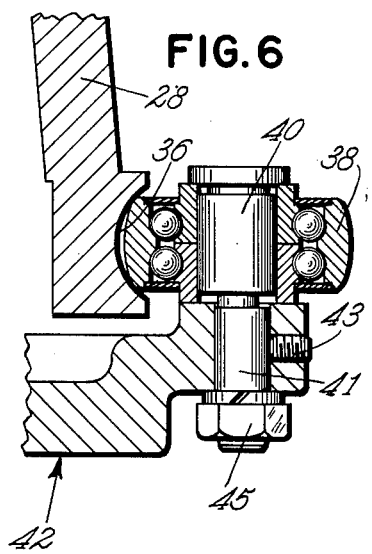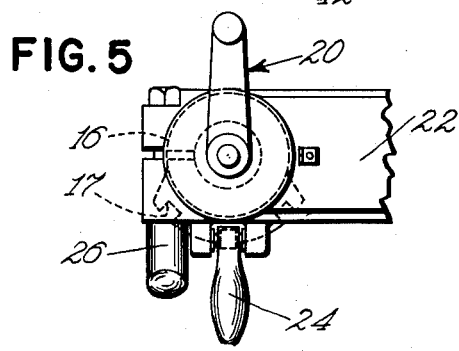

United States Patent Office 2,722,952
Patented Nov. 8, 1955

2,722,952

JOINTED RADIAL ARM MOUNTING FOR CUTTING TOOL

Charles W. Snyder, Lancaster, Pa., assignor to De Walt Inc., a corporation of Pennsylvania Application April 6, 1951, Serial No. 219,545

7 Claims. (Cl. 143—6)

This invention relates to cutting machines in general and woodworking machines in particular.

It is an object of this invention to provide an improved cutting machine, particularly a sawing machine, having greater versatility of movement relative to stationary work on a given work-supporting table.

It is another object of this invention to impart to machines of this type a new movement or positioning means for making miter cuts. With my invention, the line of both right and left-hand miter cuts passes substantially through the center of the work table. Heretofore, this has not been possible so that either excessively large, or movable, tables have been required.

Another object is to provide a sawing machine with greater adjustability for positioning the saw or cutting tool relative to the work and means for securely locking the machine in the selected attitudes.

Another object is to provide indicating control means, convenient to the hands and vision of the operator, for positioning the saw or operative cutting means relative to work.

It is a further object to provide a simplified antifriction trackway for mounting the carriage. To do this, I have employed a trackway that consists simply of a groove which may be cheaply and economically cut into the cantilever arm by milling, or even by broaching.

In the accompanying drawings:

Fig. 1 is a side elevation of the saw machine embodying my invention;

Fig. 2 is an end elevation of the same;

Fig. 3 is a sectional end elevation taken on line 3—3 of Fig. 1;

Fig. 4 is a partial plan view as seen from line 4—4 of Fig. 1;

Fig. 5 is a partial plan view of the vertical adjusting mechanism and angular arm lock of the radial arm taken on line 5—5 of Fig. 1;

Fig. 6 is a partial sectional end elevation illustrating the external track in conjunction with the carriage supporting and guiding mechanism;

Figure 8:
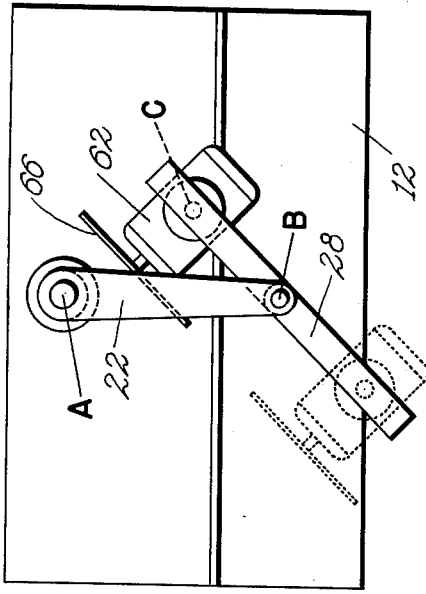

Figs. 7–10 inclusive are schematic illustrations showing various convenient and labor saving settings made possible by the combined radial arm and swivel track.

With reference to Figs. 1 and 2 of the drawings, the machine is mounted on a base 10 carrying a work-holding table 12 and a column 14. The column 14 is formed of a standard 18 which receives a columnar member 16. The member 16 may be raised or lowered in the standard 18 by a screw and nut mechanism 20.

A suitable key 15 and keyway 17 prevents rotation of the columnar member 16 in the standard 18. The radial arm 22 is pivotally secured to the top of the columnar member 16.

As shown in Fig. 1 and Fig. 5, the top of the columnar member 16 carries notches 17 arranged 45° apart, which may be engaged by the latch 24 to hold the arm 22 at angular intervals of 45°. Intermediate angular settings may be maintained by the clamping means 26.

A swivel arm 28 is pivotally mounted to the free end of the radial arm 22 by means of the bolt 30. The tightening arm 32 is threaded on the bolt 30 so that the arm 28 may be frictionally locked against motion relative to the radial arm 22. There is further provided on the radial arm 22 a spring loaded plunger which, by engaging corresponding holes 34 in the swivel arm 28, can locate that arm at predetermined angles relative to the radial arm 22.

Swivel arm 28 consists of an inverted U-shaped channel. Longitudinal tracks 36 are cut along the side of swivel arm 28. End plate 37, suitably secured in the arm 28, acts as a stop to the carriage engaged with said track.

As shown in Figs. 1, 2, 3, 4 and 6, convex rollers 38 mounted on the carriage 42 engage the track 36 whereby the carriage is slidably but firmly supported on the swivel arm 28.

While each of the two rollers 38 on one side of arm 28 is pivotally mounted on a straight stud 39, each of the other two rollers on the opposite side is pivoted to a stud shaft 40 the lower portion of which forms a crank or eccentric 41 employed for the purpose of providing adjustability to rollers 38 with respect to their correct contact with tracks 36, thus providing means for a convenient take-up in case of wear. A set screw 43 holds the eccentric 41 against rotation until the nut 45 threaded on the shaft 40 is tightly drawn up.

As shown in Fig. 6, the radius of the convexity of the roller 38 is greater than the radius of the concavity of the track 36. This allows room for take-up of the rollers upon wear.

The tracks 36 are located on the outside of the swivel arm 28 to provide greater center to center distance between the two pairs of rollers 38, thereby providing greater stability to the carriage 42. Furthermore, it permits the arm 38 to be formed as a trough casting with closed ends (adjacent the end plates 37). The gives a more sturdy construction to the arm. The groove 36 may then be conveniently broached on the outside, whereas an inside groove would have to be milled. Thus, the external positioning of the groove provides cheapness of manufacture as well as greater stability.

A C-clamp 44 is floatingly supported between the rollers on the stud 46 held by suitable lugs of the carriage 42. When the clamp is tightened by means of a suitable thumb screw it engages track 36 and the inside face of the swivel arm 28, as shown in Fig. 3.

The yoke 60 is pivotally mounted on the carriage 42 by means of a bolt 54. Threaded on one end of the bolt 54 is a tightening arm 56. The bolt 54 is held against rotation by a set screw 55 threaded in the yoke 60. Relative movement between the carriage 42 and yoke 60 may be controlled to predetermined angular settings by means of a spring loaded plunger 56 mounted on the carriage 42 engaging corresponding holes 58 in the yoke 60.

The motor 62 carrying the cutting tool 66 is pivoted in the yoke 60 on cylindrical bosses 64. As shown in Figs. 1 and 2, the angular position of the motor around this pivot point may be fixed by the plunger 68 in the yoke 60 engaging corresponding hole 61 in the plate 70 secured to one of the bosses 64. One of the arms 59 of the yoke 60 is equipped with a suitable clamping lug 74 and a locking arm 72 employed to lock the motor in intermediate angular position.

Figure 7:
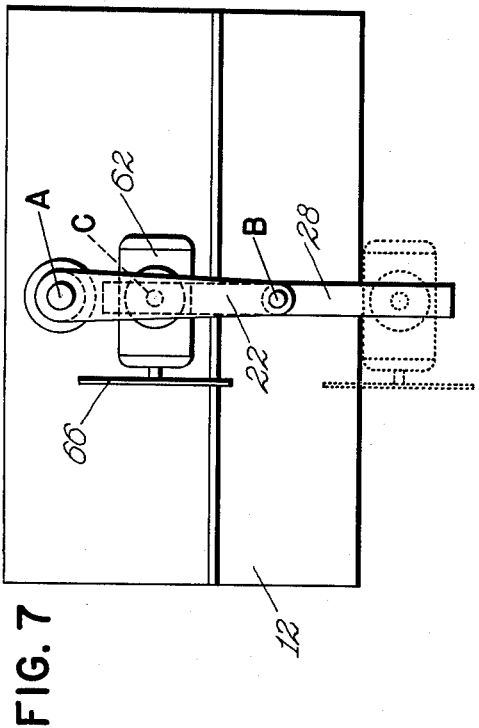
Figure 9:
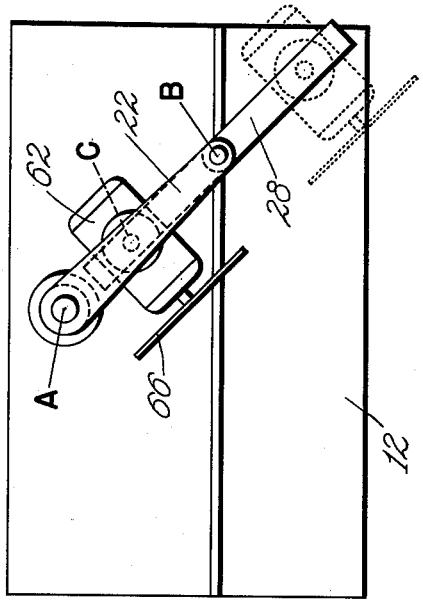

Figs. 7, 8, 9 and 10 illustrate various positions demonstrating the novel versatility of the machine constructed according to my invention. In Fig. 7, the radial arm 22 is locked at the pivot point A, the swivel arm is locked at the pivot point B, and the yoke 60 supporting the motor is locked at the pivot point C. In this position the carriage is movable back and forth over the table for conventional cross-cut. In Fig. 8, the pivot points A and C remain locked. The swivel arm 28 is rotated at the pivot point B and set the number of degrees of the desired left-hand miter cut. It will be noted that the line of the miter cut passes through a point close to the center of the table. In Fig. 9, the swivel arm 28 is returned to the zero position about the pivot point B relative to the radial arm 22. The radial arm 22 is rotated at point A to the right number of degrees of the desired right-hand cut. Again, it will be seen that the line of the cut passes through a point close to the geometric center of the table.

Figure 10:
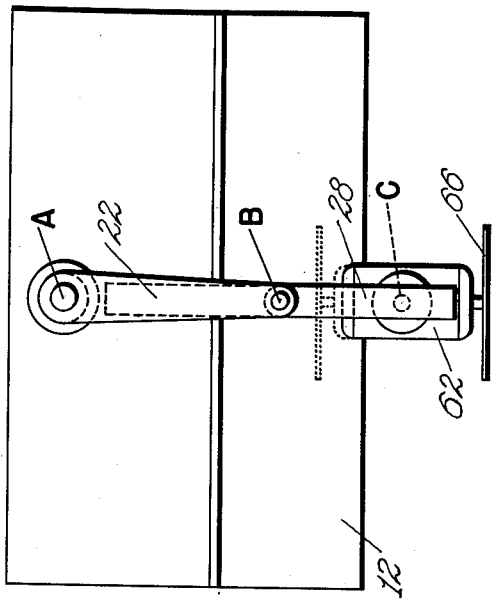

In Fig. 10, the yoke is pivoted 90° about the pivot point C relative to the swivel arm 28. The swivel arm 28 and radial arm 22 are returned to the zero position about the pivot points A and B. Here, the overhanging or beyond the table out-rip position is illustrated. Of course, the carriage may be locked in any other rip position along the arm 28. The yoke may also be rotated 180° around the pivot point C to the dotted line position shown. Bevel cuts are obtained by rotation of the motor on the boss 64 by means already described.

I claim:

1. In a woodworking device, a horizontal work-supporting table, an upright vertical standard extending above said table, a horizontal radial arm pivotally supported at its one end to said standard so that its other end may swing freely in an arc about the said vertical standard in a predetermined horizontal plane, said standard being independently adjustable upwardly and downwardly, a horizontal cantilever arm pivoted on a vertical pivot substantially at its center to the free end of said horizontal arm, a track on said horizontal cantilever arm extending substantially the length thereof, a carriage mounted for movement along said track, a tool-supporting bracket pivotally secured to said carriage, and a power-driven tool supported in said bracket and offset from a vertical plane passing through the axis of said track.

2. In a woodworking device, a horizontal work-supporting table, a horizontal arm mounted above said table so that one end thereof freely swings in a horizontal arc, a pivoted horizontal track secured substantially at its center on a vertical pivot to the free swinging end of said horizontal arm, a carriage mounted for movement along said horizontal track, and a power-driven tool mounted on said carriage, said tool being offset in a plane parallel to a vertical plane passing through the axis of said track, whereby said arm and said track may be positioned so that said cutting tool passes substantially across the center of said table during movement along said track.

3. In a woodworking machine having a power-driven tool supported above a work-supporting table, the improvement for the supporting mechanism for said tool which comprises a vertical supporting standard, a radial arm mounted at its one end at right angles to said vertical member whereby the free end of the radial arm will move through a horizontal arc, a second horizontal arm pivoted to the free end of said radial arm to swing in a horizontal plane, lateral concave longitudinal grooves in said second arm, a tool-supporting carriage, rollers mounted on said carriage and engaging said grooves whereby said carriage may move horizontally to and fro along the said second horizontal arm, and said second horizontal arm may swing around its pivot point on said radial arm, and said pivoted point may be moved through an arc horizontal to the work-supporting table when said radial arm moves about said vertical standard whereby a tool supported by said carriage and offset from the center line of said horizontal arm may pass substantially across the center of said table in various angular positions of said second horizontal arm across said table by virtue of the movement of said pivot point.

4. In a woodworking machine having a work-supporting table and a power-driven tool mounted above said table, and supporting means for said power-driven tool comprising a vertical standard, a horizontal radial arm pivoted to said standard for swinging movement in a horizontal plane, means operative to prevent rotation of said radial arm at its pivot point relative to said upright standard, a horizontal track pivoted on a vertical pivot at a point substantially at its center to the free end of said radial arm, means to prevent rotation of said horizontal track about its pivot point relative to said radial arm, a carriage, anti-friction rollers connecting said carriage to said horizontal track for movement to and fro along said horizontal track, means operative to arrest the movement of said carriage relative to said track in a predetermined position, and a tool-supporting bracket secured to said carriage to support said power-driven tool in a position offset from a vertical plane passing through the center line of said horizontal track.

5. In a woodworking tool, a work supporting table, an upright member having a vertical axis, a horizontal arm mounted at one end of said upright member, means to permit said arm to swing about said vertical axis in a constant horizontal plane, a horizontal track pivotally supported on a vertical axis substantially at its midpoint on the other end of said horizontal arm, a carriage mounted for horizontal movement along said track, a yoke secured to said carriage, and a motor-driven cutting instrument mounted on said yoke, said cutting instrument being offset from a radial plane passing through the axis of said upright member.

6. In a woodworking tool, a work supporting table, a horizontal arm positioned above said table and pivoted at a point adjacent the center rear side of said table to swing in a predetermined horizontal plane, a horizontal track pivotally supported on a vertical pivot at the free end of said horizontal arm, a carriage mounted for horizontal movement along said track, a yoke secured to said carriage, and a cutting instrument mounted in said yoke and offset to the one hand from a vertical plane passing through the axis of said horizontal arm, whereby a miter cut of said one hand may be made passing substantially through the center of the table by positioning said arm transverse said table and pivoting said track from said arm the desired angle of said miter cut and a miter cut of the opposite hand may be made substantially across the center of said table by securing said track co-longitudinally with said arm and swinging said arm from the transverse line to the desired angle of said miter cut.

7. In a woodworking tool as claimed in claim 6, further characterized in that said track comprises a horizontal arm having anti-friction means and that said carriage has complementary anti-friction means operatively mounted on said first-named means whereby it is supported for movement along said track.

References Cited in the file of this patent

UNITED STATES PATENTS

| | | |
|---|---|---|
| 1,636,924 | Porter | July 26, 1927 |
| 1,852,387 | Wieden | Apr. 5, 1932 |
| 2,022,288 | Knapp | Nov. 26, 1935 |
| 2,353,088 | Schutz | July 4, 1944 |
| 2,356,610 | Penney | Aug. 22, 1944 |